United States Patent
Frohlich et al.

(10) Patent No.: US 7,027,704 B2
(45) Date of Patent: Apr. 11, 2006

(54) OPTICAL DISTRIBUTION DEVICE AND LIGHT WAVEGUIDE CONNECTOR CABLE

(75) Inventors: Franz-Friedrich Frohlich, Hagen (DE); Peter Spende, Berlin (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 10/478,821

(22) PCT Filed: Apr. 12, 2002

(86) PCT No.: PCT/EP02/04089

§ 371 (c)(1),
(2), (4) Date: Jul. 12, 2004

(87) PCT Pub. No.: WO02/097502

PCT Pub. Date: Dec. 5, 2002

(65) Prior Publication Data

US 2004/0240807 A1   Dec. 2, 2004

(30) Foreign Application Priority Data

May 30, 2001   (DE) .............................. 101 26 351

(51) Int. Cl.
*G02B 6/36* (2006.01)

(52) U.S. Cl. .................................... 385/135; 385/53
(58) Field of Classification Search ................ 385/53, 385/134, 135
See application file for complete search history.

(56) References Cited

U.S. PATENT DOCUMENTS 5,394,503 A * 2/1995 Dietz et al. ............... 385/135

* cited by examiner

*Primary Examiner*—John D. Lee
*Assistant Examiner*—Rhonda S. Peace

(57) ABSTRACT

An optical distribution device has first connector points for the connection of incoming light waveguide cables, second connector points for the connection of outgoing light waveguide cables and at least one light waveguide connector cable having at least one connecting device on one or both ends for connecting at least one of the first connector points to at least one of the second connector points. Each connection device is provided with an electrical code memory device for storing an identification code and each of the first and second connector points are provided with an electrical code reader device connected to the associated code memory device for reading the identification code when the associated connector device is connected to one of the connector points. A controller is connected to the code reader device for evaluating the identification code to identify the optical connection effected by the light waveguide connector cable.

10 Claims, 2 Drawing Sheets

OPTICAL DISTRIBUTION DEVICE AND LIGHT WAVEGUIDE CONNECTOR CABLE

CROSS REFERENCE TO RELATED APPLICATION

This application is a National application claiming priority to International Application No. PCT/EP02/04089 filed on Apr. 12, 2002, which claims priority to German Patent Application No. 101 26 351.1, filed on May 30, 2001.

FIELD OF THE INVENTION

The invention relates to an optical distribution device and a light waveguide connector cable for use in an optical distribution device.

BACKGROUND OF THE INVENTION

In a fiber optic patch panel, the individual incoming and outgoing fibers are connected to one another by means of patch cords. Here, incoming fibers are understood as those fibers via which light signals are sent in the direction of the patch panel; the light signals are passed on from the patch panel via the outgoing fibers. Furthermore, the signal direction determines in this case whether a fiber is an incoming or outgoing fiber, that is to say the respective fiber is an incoming fiber if data signals are sent to the distribution panel via it, and it is an outgoing fiber if data signals are passed on from the distribution panel via it. Given a rising number of connections, it becomes more and more difficult to monitor the patch panel. Consequently, in order for an operator to be able, for monitoring purposes, to monitor the correct connections of the incoming fibers to the outgoing fibers more easily, it is necessary to install a system that facilitates the identification of the optical connections achieved by the patch cords and is of simple design.

The invention provides an optical distribution device and a light waveguide connector cable for connecting in an optical distribution device, by means of which optical connections present in the distribution device can be identified in a simple and yet reliable way.

SUMMARY OF THE INVENTION

The optical distribution device according to the invention has first connection points for connecting incoming light waveguide cables, second connecting points for connecting outgoing light waveguide cables, and at least one light waveguide connector cable via which one or more of the first connecting points can be connected to one or more of the second connecting points, and which has in each case at its ends one or more connecting devices for connecting to the connecting points. The connecting devices are provided in each case with an electrical code memory device in which an identification code is stored. Furthermore, the connecting points are provided for their part with a code reading device that, when the respective connecting device is connected to the respective connecting point, is connected to the associated code memory device for the purpose of reading the identification code. Furthermore, the optical distribution device has a control device that is connected to the respective code reading device via a data line, and by which the read identification codes are evaluated in order to identify the optical connection effected by the respective light waveguide connector cable. In accordance with the invention, the respective code memory device is formed by an electronic memory chip that, when the respective connecting device is connected to the respective connecting point, is electrically connected to the associated code memory device for the purpose of reading the identification code.

In the case of the optical distribution device according to the invention, the optical connections achieved by the one or the plurality of light waveguide connector cables can be reliably identified. For this purpose, the control device interrogates all the connecting points at regulator intervals, for example. If no connecting device is connected to the interrogated connecting point, the control device receives, for example, simply no signal from the code reading device there, as a result of which the control device detects that no connection is present.

In the case in which a connecting device of a connector cable is connected to a connecting point, the control device receives the identification code of the associated connecting device from the code reading device there, and can thereby exactly identify the connection achieved by the associated connector cable and communicate it to the operator.

The control device can also be designed in such a way that when the connector cables are being laid it gives the operator instructions as to how the associated connecting devices, and thus the connector cables, are to be connected. For this purpose, the control device can, for example, indicate that the connecting device with a specific identification code is to be connected to a specific connecting point. So that the operator can seize the corresponding connecting device and connect it to the indicated connecting point, both the connecting device and the connecting point are, for example, labeled with a corresponding identification mark, for example in the form of an embossment or a plaquette. The control device can then simultaneously check in the way explained above as to whether the connections have also been established correctly, and thus as to whether the desired optical connection has been made.

Because of its small size, the electronic memory chip can be arranged on the connecting device in a simple way that is particularly space saving. The electrical connection between the code reading device and the code memory device can be implemented simply in terms of design, for example by means of simple contact springs that make contact with a soldered joint as corresponding contact point, and are thus implemented cost effectively. Furthermore, the memory chip supplies the identification code in the form of electric signals that can be passed on directly along wire lines or conductor tracks; there is thus no need to convert the code signals emanating from the chip into signals that can be passed on in such a way, nor any need for a converting device connected thereto. Power is preferably supplied to the electrical code memory devices via the electrical contact with the code reading devices. However, it is also conceivable for the code memory devices to be provided in each case with a dedicated battery that is also attached to the associated connecting device.

The connecting device can be a connecting plug or a socket that can be coupled to an associated socket or a connecting plug of the connecting point of the distribution device.

The light waveguide connector cable can be a single-fiber cable, that is to say a cable that has only a single optical fiber. However, the light waveguide connector cable is, in particular, a multifiber cable, that is to say a cable that comprises a plurality of optically conducting fibers. According to one embodiment, the multifiber light waveguide connector cable respectively has at its ends a multifiber connecting device such as, for example, a multifiber plug. According to another design, single-fiber connecting devices such as, for example, single-fiber plugs that are assigned to the respective optical fiber of the cable are provided at one or at both ends.

The code memory device can have, for example, connecting contacts in the form of contact springs that can be brought into contact with associated contact points on the code reading device. It is preferred for the code memory device to be designed in conjunction with the respective code reading device in such a way that with the connection of the associated connecting device to the connecting point the code memory device is automatically connected to the code reading device. According to one embodiment of the invention, the code reading device is designed as a printed circuit board on which there are constructed reading contact points that make contact with mating contact components, e.g. contact springs, of the code memory device when the connecting device is connected. The printed circuit board constitutes a solution that is likewise advantageous with reference to the overall size; in addition, it is also possible already to provide on the printed circuit board control devices by means of which the signals to be fed to the control device are already conditioned in advance.

However, the code memory device can also have a printed circuit board on which there are constructed transmission contact points that are brought into electrical connection with the mating contact components, such as contact springs, for example, arranged on the distributing side whenever the connecting device is connected to the connecting point.

The identification of the respective optical connection can be explained according to the invention in the following way.

According to one embodiment, there is stored as identification code in the respective electrical code memory device a multidigit number whose last numeral (or last bit) defines the type of the light waveguide connector cable, the preceding numerals respectively individually defining the light waveguide connector cable together with the connecting devices connected thereto. Instead of the last numeral, it is also possible to use another, arbitrary numeral, for example, in the form of a bit, in the identification code for the purpose of defining the type of the light waveguide connector cable. In this case, the identification code individually assigned to the respective cable is formed by the numerals or bits surrounding this numeral or this bit, the predetermined numerals always remaining the same for the respective associated cable type.

In the case in which, for example, the light waveguide connector cable is provided at both ends with a single connecting device in each case, the identification code that is stored in the two code memory devices then associated with this connector cable can be, for example, the number 34561841. From the last numeral, for example, here a 1, the control device detects that this connector cable is the said type with in each case a single connecting device at the cable ends. The two identification codes are identical to one another, and so as soon as [the] control device has detected the identification code of the one connecting device at a connecting point it need only then search for the other connecting point at which the same identification code is present in order to identify exactly the optical connection thereby achieved.

In the case in which, for example, a light waveguide connector cable is present that has a single connecting device only at one end, whereas a multiplicity of connecting devices is present at the other end, the identification of such a cable together with the optical connections achieved by this cable can be performed, for example, by defining precisely this type of cable once again on the basis of the last numeral of the identification code, in which case, however, the preceding numerals of the connecting devices belonging to this cable are no longer identical to one another, but differ from one another, for example in the form of a serial enumeration.

In the case of an eight-fiber light waveguide connector cable that has an eight-fiber connecting device at one end and has eight single-fiber connecting devices at the other end, the final numeral, defining the type of this cable, of the identification code can be, for example, 2; the identification code of the multifiber connecting device can in this case have the number 4567322, for example. On this basis, the eight single-fiber connecting devices then receive the numbers 4567332 to 4567402. The control device uses the final numeral 2 to detect that such a serially numbered sequence of numerals must be present and, as soon as it has detected such an identification code, consequently searches automatically for the codes in the distribution devices that belong to the detected numerical sequence. Consequently, the individual optical connections arising from the multiple connecting device can be detected in a simple and reliable way. Instead of the final numeral of a numerical code, it is also possible to use an arbitrary other numeral in the numerical code for the purpose of type identification.

It is also possible to use numerical codes that are nonrecurring in principle. Thus, for example, the sequence of numerals that precedes the last numeral generally defining the connector cable type can be defined by the following formula:

$$CZF(n,x) = Z_{Max} * n + Z(n,x).$$

Here, $CZF(n,x)$ is the code numerical sequence of the connecting device x of the connector cable n, $Z_{Max}$ is the number of connecting devices of that connector cable which has the most connecting devices of all the connector cables used in the distribution device, and $Z(n,x)$ is a serial numeral from 0 up to the number of connecting devices x of the associated connector cable minus 1, which numeral $Z(n,x)$ is assigned to the respective connecting device of this connector cable n.

This selection of identification codes is therefore suitable, for example, for distribution devices in which use is made only of such connector cables that have at one end, for example, only a single connecting device and have up to a maximum of $Z(n,x)$ connecting devices at the other end. In the case of such a distribution device having, for example, connector cables with in each case only one connecting device at one cable end and a maximum of eight connecting devices at the other cable end, the connecting devices of a first cable (n=1), which has in each case only one connecting device at both its ends, have the code numerical sequences $CZF(1,1)=9*1+0=9$ and $CZF(1,2)=9*1+1=10$. The associated identification codes are . . . 000091 and . . . 000101; as explained above, the last numeral (here 1) of the identification code always remains the same, and identifies this cable type. A second connector cable (n=2), which has a single connecting device at one end and eight connecting devices at the other end, then has the code numerical sequences $CZF(2,1)=9*2=18$ up to $CZF(2,9)=9*2+8=26$, the associated code numbers of these identification codes then going from . . . 0000182 to . . . 000262. There is also the possibility of not using a cable type identification numeral, that is to say of not using an index bit. It is then possible, for example, for in each case one connecting device per connector cable, in particular a multifiber connecting device, to be assigned a specific numeral at a point in the numerical code, for example in the way that the numerical code of this connecting device always ends with the numeral 0, in which case then the other plugs of this connector cable receive serially increased numbers starting from the numeral 0.

The identification codes used can in each case be processed by the control device in such a way that when the latter has identified an identification code of a connecting device of a connector cable it can immediately determine the identification code of the connecting devices still belonging to this connector cable, in order to be able to determine exactly their connecting positions and thus the associated optical connections.

The code memory device can be freely attached, for example glued on or screwed on, to the outside of the connecting device. It is preferred to accommodate the code memory device in a housing that is for its part attached to the connecting device, in particular to its outside. The housing of the code memory device can be provided in one integral piece with the housing of the connecting device, it being possible for the code memory device, that is to say the memory chip, also to be encapsulated directly into the housing. However, it is preferred to attach the code memory device exchangeably to the connecting device; thus, for example, it can simply be clipped onto the connecting device. For this purpose, it is possible to provide on the connecting device, in particular on a housing of the same, an adapter device, for example in the form of a base, onto which an assigned holding device to which the code memory device is attached can be clipped. This has the advantage that existing connector cables can also be rendered capable of use for the invention retrospectively.

The inventive light waveguide connector cable for use in an optical distribution device has one or more optical fibers for transmitting light signals and, at each end, one or more connecting devices that are provided in each case with an electrical code memory device that stores an identification code for identifying the associated connecting device and the optical fiber(s) connected thereto. The code memory device is formed by an electronic memory chip that has connecting elements such as, for example, contact tongues, contact springs or soldered contact points, for electrical coupling to a code reading device, in order to transmit the stored identification code to the code reading device via such an electrical contact. The light waveguide connector cable according to the invention is provided, in particular, for making an optical connection between connecting points of incoming and of outgoing lines; however, it is also possible to make other optical connections to the connector cable according to the invention.

According to an alternative embodiment of the invention, a light waveguide connector cable for making optical connections is provided that has one or more optical fibers for transmitting light signals, and one or more connecting devices at least one end, only the connecting devices provided at one end respectively being provided with an electrical code memory device that stores an identification code for identifying the associated connecting device and the optical fiber(s) connected thereto, and the optical fiber(s) connected to the respective connecting device being provided with an externally visible marking assigned to the associated identification code.

In the case of this light waveguide connector cable according to the invention, the optical connection is automatically identified only at one end of the respective optical fiber, an operator being able to see the course of the latter from the externally visible marking. The marking can be, for example, a color marking such as, for example, a color-marked or completely colored optical fiber cladding or an imprint applied to such a cladding. The fiber marking is advantageously provided at the other end of the respective fiber. The code memory device is preferably likewise an electronic memory chip, for the reasons mentioned above.

When such a connector cable is connected, the control device prescribes, for example, those connecting points to which the optical connector cable is to be connected with the aid of its connecting devices provided with a code memory device. The control device thereby outputs these connecting points sequentially, for example always together in pairs with the respective opposite connecting point, such that with the aid of the respective markings of the optical fibers the operator is also able without any problem to assign the fiber ends not provided with electrical code memory devices to the associated connecting points.

According to one embodiment of the invention, the respective connecting device has a housing to the outside of which the code memory device is permanently attached. Here, it is preferred for the attachment to be such that the code memory device can be brought into connection with an associated code reading device by connecting the connecting device. The connecting device is designed, in particular, as connecting plug. The code memory device is preferably, for its part, attached in a housing that is fastened on the housing of the connecting device.

However, it is also possible to provide the code memory device with an electrical connecting device that is provided separately from the optical connecting device of the waveguide connector cable and can be connected to an associated electrical contact device such as socket, for example, separately from the connecting movement of the connecting device.

BRIEF DESCRIPTION OF THE DRAWINGS

The invention is explained below with the aid of preferred embodiments with reference to the drawing, in which.

DETAILED DESCRIPTION OF THE INVENTION

Figure 1:
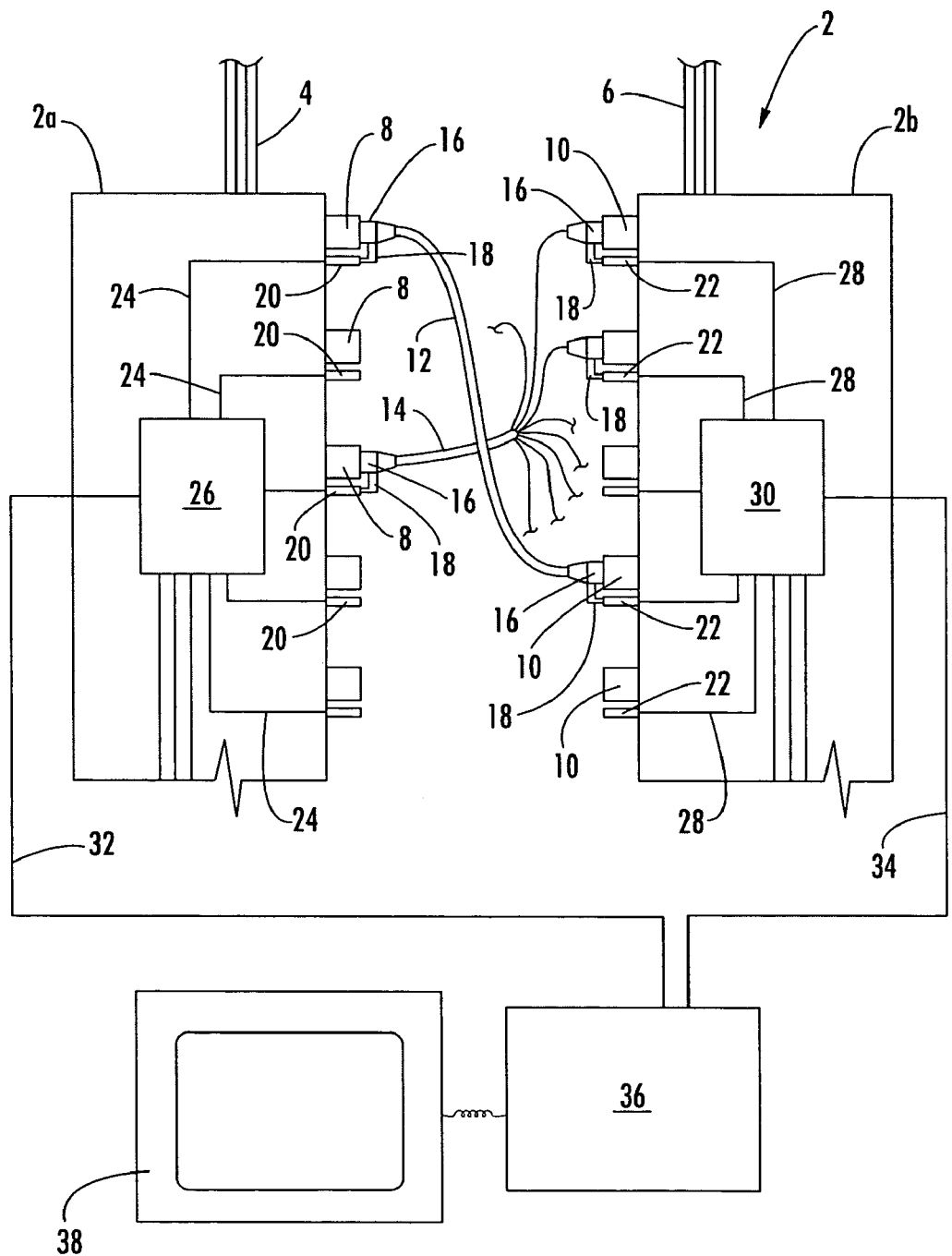
FIG. 1 shows a schematic of a distribution device according to one embodiment of the invention.

FIG. 1 illustrates schematically a module 2 of a multi-module, optical distribution device in accordance with one embodiment of the invention. The module 2 of the optical distribution device has a first submodule 2a, to which incoming optical lines 4 are connected, and a second submodule 2b, to which the outgoing optical lines 6 are connected. The incoming optical lines 4 are connected for this purpose to first connecting points 8 that are provided at the first submodule 2a and are designed here in the form of sockets. The outgoing lines 6 are connected to second connecting points 10, which are arranged at the second submodule 2b and are likewise provided as sockets.

Light signals are led up to the distribution device via the incoming optical lines 4; the light signals incoming at the distribution device are passed on via the outgoing optical lines 6.

For the purpose of distributing the light signals conducted by the incoming lines 4, the distribution device has a plurality of light waveguide connector cables 12, 14 (only two being illustrated), which are connected between the first submodule 2a and the second submodule 2b, in order to connect the first and the second connecting points 8, 10 and thus the optical lines 4, 6 connected thereto, to one another in a desired way. For this purpose, depending on connector cable type, the light waveguide connector cables 12, 14 have at their ends in each case one or more connecting devices 16 that are provided here as connecting plugs in a fashion matching the connection points 8, 10 provided as sockets.

One light waveguide connector cable 12 is designed here as a multifiber cable that has at each end only one multifiber connecting device 16 in the form of a multifiber plug. The other light waveguide connector cable 14 is likewise a multifiber cable, but has a multifiber connecting device 16 only at one end (the end facing the first submodule 2a), whereas a plurality of single-fiber connecting devices 16 in the form of single-fiber plugs are provided at the other end 8 (only two single-fiber connecting devices being illustrated).

Figure 2:
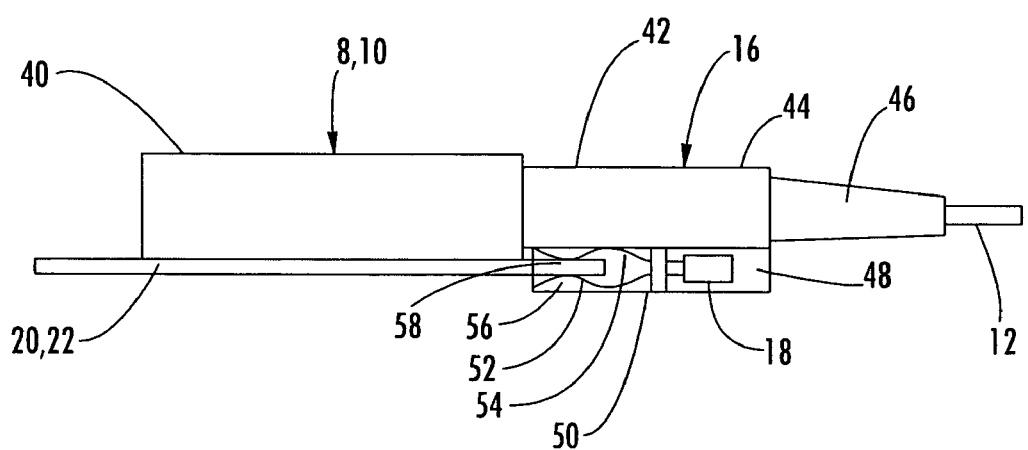
FIG. 2 shows a schematic of an inventive light waveguide connector cable that is connected to a connecting point of an optical distribution device.

All the connecting devices 16 of the distribution device are provided with an electrical code memory device 18 that is assigned to them individually in each case and of which one embodiment is explained in more detail in FIG. 2. The respective electrical code memory device 18 stores an identification code that is assigned to the associated connecting device 16 such that the latter can be identified with the aid of the identification code.

In order to be able to tap the identification code, each connecting point 8, 10 is provided with a code reading device 20, 22 that, when a connecting device 16 is connected to the connecting point 8, 10 associated with the code reading device 20, 22, is connected for the purpose of data transmission to the code memory device 18 belonging to the connected connecting device 16.

As is the case in the embodiment shown, it is preferred in this case for the connecting devices 16 with their code memory devices 18 and the connecting points 20, 22 with their code reading devices 22 to be designed in such a way that an electrical connection of the associated code memory devices 18 to the code reading devices 20, 22 is made simultaneously with the connection of the connecting devices 16 to the connecting points 8, 10 (here by plugging the connecting plugs 16 into the sockets 8, 10).

The code reading devices 20 of the first submodule 2a are connected to a first computing device 26 inside the module via electrical data lines 24. The code reading devices 22 of the second submodule 2b are connected to a second computing device 30 inside the module via electrical data lines 28. The first computing device 26 and the second computing device 30 are connected, for their part, via associated, electrical data lines 32, 34 to a control device 36 that here forms a central control device of the optical distribution device.

The control device 36 is connected to a display device 38, for example an output monitor, and an input device (not illustrated), for example a computer keyboard. Instead of being connected to the interposed computing devices 26, 30 inside the module, the code reading devices 20, 22 can also be connected directly via their data lines 24, 28 to a control device such as the central control device 36 of the distribution device, it then being possible to eliminate the interposed computing devices 26, 30.

Under the control of the control device 36 and the computing devices 26, 30, the connecting points 8, 10 of the respective modules 2 of the distribution device are interrogated with the aid of the code reading devices 20, 22 at regular intervals and/or as required as to whether a connecting device 16 is connected thereto. An existing connection can be determined, for example, by the fact that the code reading device 20, 22 can tap the stored identification code from the code memory device 18 of a connected connecting device 16. If such a tapping operation is not possible, the control device 36 detects that no connecting device 16 is connected to the interrogated connecting point 8, 10. The interposed computing devices 26, 30 can condition data detected by the reading devices and pass them to the central control device 36; conversely, the computing devices 26, 30 pass on control commands coming from the control device 36 to the respective reading devices 20; the latter are thereby capable of being driven centrally in conjunction with the reduced need for data lines.

The control device can then use the identification codes, which are assigned individually to the respective connecting devices 16, to determine precisely which connecting device 16 is connected to which connecting points 8, 10. The optical circuitry plan determined thereby by the control device 36 is communicated to an operator via the display device 38. It is also possible that as the operator is patching the control device 36 uses the display device 38 to prescribe which connecting device 16 is to be connected to which connecting point 20, 22. For this purpose, the control device 36 prescribes a previously input circuitry plan, for example in the way that it outputs sequentially the respective connecting points 8, 10, for example in the form of the output of connecting point numbers, and together with these connecting point numbers, outputs the identification codes of those connecting devices 16 that are to be connected to these connecting points 8, 10. The identification code for this can, for example, be arranged additionally in an externally visible fashion for example in the form of an embossment or an adhesive label on the respective connecting device 16. After the connection is made, the control device 36 checks the optical connection in the way explained above and, if appropriate, outputs a warning signal if the optical connection determined by it does not correspond to the optical connection prescribed to the operator.

FIG. 2 illustrates in more detail in a schematic way the connecting point 8, 10 of an inventive optical distribution device in the case of a connected connecting device 16 of an associated light waveguide connector cable 12, 14.

The connecting point 8, 10 has a socket 40 in the form of a mechanical light waveguide coupling piece. Attached to the outside of the socket 40 is a code reading device 20, 22 that is designed here in the form of a printed circuit board on which electrically conducting contacts are constructed for example in the form of conductor tracks, on both sides.

The connecting device 16 of the light waveguide connector cable 12, 14 connected to the connecting point 8, 10 has a connecting plug 42 that is assigned to the socket 40 and has: a plug housing 44 in which the optical fiber(s) are guided, an anti-kink sleeve 46 which protects the transition from the optical fibers, running in the plug housing 44, of the connector cable 12, 14 into the cable sheath, and a protective cover 48 that is attached on the outside to the plug housing 44 and in which a code memory device 18 is accommodated in a protected fashion in the form of an electronic memory chip.

The code memory device 18 is attached to the plug housing 44 by means of a holder 50. The holder 50 can be designed in one integral piece with the plug housing 44. The code memory device 18 is preferably attached releasably to the holder 50 such that it can be exchanged as required. According to this embodiment, the code memory device 18 has as contacting and connecting elements two contact springs 52, 54 that point forward (in the plugging direction of the connecting device 16) in the longitudinal direction of the plug housing 44 and are situated opposite one another and can be spread apart outward from one another resiliently. In the state shown, the code reading device 20, 22 is clamped between the two contact springs 52, 54 which are thereby pressed against contact points 56, 58 that are provided on the code reading device 20, 22 and are provided, for example, in the form of soldered joints. An electrical connection is achieved as a result between the code memory device 18 and the code reading device 20, 22.

The code memory device 18 is connected permanently to the connecting plug 42 in such a way that it can also be moved together with the latter, the electrical contact of the code memory device 18 and the code reading device 20, 22, and thus the electrical connection required for tapping the identification code, being achieved at the same time as the optical plug 42 is plugged into the associated optical socket 40.

The invention claimed is:

1. An optical distribution device comprising:
   first connecting points for connecting incoming light waveguide cables;
   second connecting points for connecting outgoing light waveguide cables; and
   at least one light waveguide connector cable via which at least one of the first connecting points is connected to at least one of the second connecting points, each light waveguide connector cable having opposed ends and at least one connecting device on at least one of the ends for connecting to the first connecting points or to the second connecting points, each connecting device being provided with an electrical code memory device in which an identification code is stored and the first connecting points or the second connecting points being provided with an electrical code reading device that is connected to the associated code memory device for reading the identification code, the code memory device being formed by an electronic memory chip that is electrically connected to the associated code reading device when the connecting device is connected to the first connecting points or to the second connecting points; and
   a control device connected to the code reading device for evaluating the identification code to identify an optical connection effected by the light waveguide connector cable;
   wherein the code reading device comprises a printed circuit board on which there are provided one or more reading contact points that make contact with one or more mating contact components of the code memory device when the connecting device is connected to the first connecting points or to the second connecting points.

2. An optical distribution device comprising:
   first connecting points for connecting incoming light waveguide cables;
   second connecting points for connecting outgoing light waveguide cables; and
   at least one light waveguide connector cable via which at least one of the first connecting points is connected to at least one of the second connecting points, each light waveguide connector cable having opposed ends and at least one connecting device on at least one of the ends for connecting to the first connecting points or to the second connecting points, each connecting device being provided with an electrical code memory device in which an identification code is stored and the first connecting points or the second connecting paints being provided with an electrical code reading device that is connected to the associated code memory device for reading the identification code, the code memory device being formed by an electronic memory chip that is electrically connected to the associated code reading device when the connecting device is connected to the first connecting points or to the second connecting points; and
   a control device connected to the code reading device for evaluating the identification code to identify an optical connection effected by the light waveguide connector cable;
   wherein the identification code is fanned by a multidigit code number, the last numeral of the code number defining the type of the light waveguide connector cable and the preceding numerals defining the light waveguide connector cable and the connecting devices.

3. The optical distribution device of claim 2, wherein the light waveguide connector cable is provided with a multi-fiber connecting device at one end and with a plurality of single fiber connecting devices at the other end and wherein the multidigit code number of each associated identification code is provided in the form of a serial enumeration, with the exception of the last numeral defining the type of the light waveguide connector cable.

4. The optical distribution device of claim 2, wherein the light waveguide connector cable is provided with a connecting device at both ends and wherein the associated identification codes are identical to one another.

5. The optical distribution device of claim 2, wherein the numerals preceding the last numeral of the code number are determined from the formula:

$$CZF(n,x) = Z_{Max} * n + Z(n,x),$$

$CZF(n,x)$ being the code numerical sequence of the connecting device x of the light waveguide connector cable n, $Z_{Max}$ being the number of connecting devices of the light waveguide connector cable which has the most connecting devices of the light waveguide connector cables used, and $Z(n,x)$ being a serial numeral from 0 up to the number of connecting devices x of the associated light waveguide connector cable n minus one, which numeral is assigned to the respective connecting device x.

6. A light waveguide connector cable having opposed ends for use in an optical distribution device comprising:
   one or more optical fibers for transmitting light signals; and
   one or more connecting devices at each end of the light waveguide connector cable that are provided with an electrical code memory device for storing an identification code that identifies the associated connecting device and each optical fiber connected to the associated connecting device, the code memory device being formed by an electronic memory chip that has connecting elements for electrical coupling to a code reading device to transmit the stored identification code to the code reading device;
   wherein the code reading device comprises a printed circuit board on which there are provided one or more reading contact points that make contact with one or more mating contact components of the code memory device when the connecting device is connected to the first connecting points or to the second connecting points.

7. A light waveguide connector cable having opposed ends for use in an optical distribution device comprising:
one or more optical fibers for transmitting light signals; and
one or more connecting devices at each end of the light waveguide connector cable that are provided with an electrical code memory device for storing an identification code that identifies the associated connecting device and each optical fiber connected to the associated connecting device, the code memory device being formed by an electronic memory chip that has connecting elements for electrical coupling to a code reading device to transmit the stored identification code to the code reading device;
wherein the associated connecting device comprises a housing and wherein the code memory device is attached to the outside of the housing such that the code memory device is connected to the associated code reading device by connecting the connecting device.

8. A light waveguide connector cable having opposed ends for use in an optical distribution device comprising:
one or more optical fibers for transmitting light signals; and
at least one connecting device on at least one end of the light waveguide connector cable, each connecting device connected to an electrical code memory device that stores an identification code for identifying the associated connecting device and each optical fiber connected to the associated connecting device; and
wherein each optical fiber connected to the associated connecting device is provided with an externally visible marking assigned to the identification code.

9. The light waveguide connector cable of claim 8, wherein the code memory device is formed by an electronic memory chip that has connecting elements for electrically coupling to a code reading device to transmit the stored identification code to the code reading device.

10. A light waveguide connector cable having opposed ends for use in an optical distribution device comprising:
one or more optical fibers for transmitting light signals; and
one or more connecting devices at each end of the light waveguide connector cable that are provided with an electrical code memory device for storing an identification code that identifies the associated connecting device and each optical fiber connected to the associated connecting device, the code memory device being formed by an electronic memory chip that has connecting elements for electrical coupling to a code reading device to transmit the stored identification code to the code reading device;
wherein the identification code is formed by a multidigit code number, the last numeral of the code number defining the type of the light waveguide connector cable and the preceding numerals defining the light waveguide connector cable and the connecting devices.

* * * * *